(12) United States Patent
Assion

(10) Patent No.: US 7,048,848 B2
(45) Date of Patent: *May 23, 2006

(54) HYBRID SPIN-ON FILTER

(76) Inventor: Norbert Assion, 23 Cynthia La., Shelton, CT (US) 06484

( * ) Notice: Subject to any disclaimer, the term of this patent is extended or adjusted under 35 U.S.C. 154(b) by 158 days.

This patent is subject to a terminal disclaimer.

(21) Appl. No.: 10/424,448

(22) Filed: Apr. 28, 2003

(65) Prior Publication Data

US 2004/0011715 A1    Jan. 22, 2004

Related U.S. Application Data

(63) Continuation-in-part of application No. 09/812,977, filed on Mar. 20, 2001, now Pat. No. 6,605,215.

(51) Int. Cl.
    *B01D 27/14* (2006.01)
(52) U.S. Cl. .................. 210/117; 210/136; 210/253; 210/256; 210/259; 210/315; 210/418; 210/440; 210/DIG. 13; 210/DIG. 17
(58) Field of Classification Search .............. 210/117, 210/136, 253, 256, 259–262, 315, 342, 418, 210/439, 440, DIG. 13, DIG. 17
    See application file for complete search history.

(56) References Cited

U.S. PATENT DOCUMENTS

| 2,843,268 A | 7/1958 | Kennedy | 210/130 |
|---|---|---|---|
| 3,021,955 A | 2/1962 | Joyce | 210/132 |
| 3,245,541 A | 4/1966 | Silverwater | 210/307 |
| 3,269,541 A | 8/1966 | Neely | 210/132 |
| 3,370,708 A * | 2/1968 | Hultgren et al. | 210/130 |
| 3,467,256 A | 9/1969 | Humbert, Jr. et al. | 210/132 |
| 3,975,273 A | 8/1976 | Shaltz et al. | 210/74 |
| 3,986,960 A | 10/1976 | Wire et al. | 210/232 |
| 4,048,071 A | 9/1977 | Yamada et al. | 210/90 |
| 4,557,829 A | 12/1985 | Fields | 210/132 |
| 4,738,776 A | 4/1988 | Brown | 210/168 |
| 5,178,753 A | 1/1993 | Trabold | 210/130 |
| 5,552,065 A | 9/1996 | Meddock et al. | 210/808 |
| 5,888,383 A | 3/1999 | Cox | 210/130 |
| 6,350,379 B1 | 2/2002 | Roll et al. | 210/323.2 |
| 6,605,215 B1 * | 8/2003 | Assion | 210/253 |

FOREIGN PATENT DOCUMENTS

| DE | 37 044 68 A1 | 8/1988 | |
|---|---|---|---|
| GB | 1133860 | 11/1968 | |
| JP | 45-7112 | * 3/1970 | 210/315 |

* cited by examiner

*Primary Examiner*—Matthew O. Savage
(74) *Attorney, Agent, or Firm*—Harrington & Smith, LLP

(57) ABSTRACT

A hybrid oil filter assembly includes a housing and a first (e.g., conventional) oil filter element disposed in proximity to a bottom portion of the housing. The first oil filter element contains an open inner volume. A second oil filter element having a generally circular cylindrical shape is disposed circumferentially about a length of the first oil filter element. The second oil filter element may be made of rolled paper and filters particles of a smaller size than the first oil filter element (e.g., down to about one microns, thereby providing micro-filtering of the engine oil).

30 Claims, 13 Drawing Sheets

HYBRID SPIN-ON FILTER

CROSS-REFERENCE TO RELATED APPLICATION

This is a continuation-in-part patent application of patent application Ser. No. 09/812,977 filed Mar. 20, 2001, now U.S. Pat. No. 6,605,215 B2.

FIELD OF THE INVENTION

This invention relates generally to filtration systems and methods and, more particularly, to a filter assembly intended to remove impurities from a liquid, such as a lubricant, and, more specifically still, to a hybrid spin-on oil filter assembly for use with an internal combustion engine, where the hybrid spin-on oil filter assembly is form and fit compatible with a conventional oil filter assembly, but which provides a dual-stage filtering action that includes a conventional oil filter in combination or in parallel with a bypass oil filter capable of filtering and retaining particles of size one micron or greater.

BACKGROUND OF THE INVENTION

Conventional internal combustion engines used in automobiles and similar vehicles include a spin-on oil filter assembly for cleaning the motor oil. However, due to the fact that the conventional oil filter assembly only effectively removes particles of size 10 microns and larger, after some period of time smaller particles build up in the engine oil and require that the engine oil be replaced. Typical engine oil, and oil filter, replacement schedules are every 3,000 miles or three months, whichever occurs first.

It is known in certain types of vehicles, such as large trucks, to use an auxiliary bypass filter for additional filtering. A typical bypass filter retrofits to the truck engine where it diverts oil through a finer auxiliary filter element at a slower flow rate than the normal oil filter (e.g. 2.5 gallons per minute or less versus about 20 to 40 gallons per minute). Passing the engine oil through the auxiliary filter element aids in filtering out particles smaller than about 40 microns in size, thereby improving engine oil life as well as the life of the engine. Reference in this regard can be had to, for example, U.S. Pat. No. 5,552,065, Meddock et al.

However, this type of filtering arrangement is not typically suitable for use with automobiles and similar types of vehicles. A first issue relates to the difficulty in retrofitting a bypass oil filter assembly to the engine. In many cases there may simply not be room to mount the bypass oil filter assembly. A second issue relates to cost, as the use of the bypass oil filter assembly is inherently more costly than the use of only the conventional type of oil filter assembly.

As can be appreciated, there is a significant body of prior art that has been built up over the decades relating to oil filters and related techniques for internal combustion engines. Representative of this prior art are the following U.S. Patents.

In U.S. Pat. No. 3,986,960, Wire et al., describe a fluid filter containing a tubular canister having a contaminated fluid inlet and a filtered fluid outlet. The filter includes a solid tube forming a vertical central conduit within the canister and a plurality of axially space-apart containers mounted serially along the tube. Filtering material is located in the canisters. Ports in the tube communicate with chambers formed between the filter element and the bottom of the container. A seal is effected between the outlet of the canister and the tube, while fluid communication is provided between the inlet and the open tops of the containers such that fluid flow occurring between the inlet and the outlet takes place through the filter elements.

In U.S. Pat. No. 4,048,071, Yamada et al. describe a liquid filtering device where the peripheral surface of a coil of a filter web wound about a hollow shaft is covered by a liquid-impervious flexible coating, and the outer periphery of a first end of the coil is secured to a supporting disc so that when liquid to be filtered is caused to pass through the coil in the axial direction of the coil, the convolutions of the coil near a second end expand radially outwardly to trap contaminants in the spiral gap. Purified liquid collected at the first end of the coil is discharged through the hollow shaft. The filter unit is constructed such that a number of unites can be connected in series.

In U.S. Pat. No. 4,738,776 Brown describes a lubricant filter assembly for an internal combustion engine that includes a head member removably mounted on a base member. The head member includes a sleeve-like housing open at one end and having first and second filter units fixedly mounted therein. The outer peripheries of the filter units coact with the interior surface of the housing to form a common inlet passage. One of the filter units is provided with an interior first outlet passage which communicates with a first passage formation formed in the base member. The first passage formation communicates with a first lubricating circuit of the engine. The second filter unit is provided with an interior second outlet passage which communicates with a second passage formation formed in the base member. The second passage formation communicates with a second lubricating circuit of the engine. Seal sections are carried by the head member. One seal section effects a sealing engagement between the base member and a portion of the housing defining the open end. A second seal section is disposed within the housing and prevents direct communication between the inlet passage and the first outlet passage. A third seal section is disposed within the housing and prevents communication between the first and second outlet passages. The sealing engagement effected by the third seal section is enhanced upon the flow pressure within the interior first outlet passage being increased.

In U.S. Pat. No. 5,178,753 Trabold describes an oil filter for internal combustion engines that is used in a secondary oil circuit in addition to a conventional oil filter. The oil filter includes a filter housing in which a filter element consists of a roll of absorbent paper that is wound about a rod. The oil filter is configured as a set of elements that comprises body sections and caps, and a rod with the rolled filter element. The volume of the oil filter can be matched to a particular application by connecting a plurality of body sections with an appropriate number of rods.

In U.S. Pat. No. 5,556,543 Trabold describes an oil filter for internal combustion engines. The oil filter includes a filter housing and a filter packing made of a porous deformable material, e.g., a roll of absorbent paper. To prevent the filter packing from being deformed and thereby preventing a smooth flow through the filter packing, stabilizing elements, e.g., stabilizing bars, are provided for fixing the form and position of the filter packing within the filter housing.

A long-felt and unfulfilled need exists to provide an oil filter assembly for an internal combustion engine that provides, within a conventionally-sized oil filter container, a conventional oil filter and a bypass oil filter capable of entrapping and thus removing smaller particles from the oil than the conventional oil filter.

Prior to this invention, this need was not adequately fulfilled by the prior art filter assemblies and methods that are known to the inventor.

OBJECTS AND ADVANTAGES OF THE INVENTION

It is a first object and advantage of this invention to provide an improved oil filter assembly.

It is a further object and advantage of this invention to provide an improved oil filter assembly that contains a first oil filter as well as a bypass oil filter, capable of filtering out smaller particulates from the oil flow than the first oil filter, where the oil filter assembly is form and fit compatible with a conventional oil filter assembly.

SUMMARY OF THE INVENTION

The foregoing and other problems are overcome and the foregoing objects and advantages are realized by apparatus and methods in accordance with embodiments of this invention.

An oil filter assembly for use with an internal combustion engine provides, within a conventionally-sized oil filter container, a first or primary oil filter and a bypass oil filter that is capable of entrapping and thus removing smaller particles from the oil (e.g., one micron or greater) than the primary oil filter. The resulting primary oil filter and bypass oil filter assembly, also referred to herein as a hybrid oil filter assembly, is preferably form and fit compatible with a conventional oil filter assembly. That is, the hybrid oil filter assembly can be used to replace a conventional oil filter assembly without making or requiring any modifications to the engine or the filter housing. Furthermore, the hybrid oil filter assembly in accordance with the teachings of this invention is designed to be cost-competitive with the conventional oil filter assembly, especially when one considers the extended oil, oil filter and engine lifetimes that are achieved. The hybrid oil filter assembly is also amenable to being mass produced, and does not require the use of any non-standard materials or components during its manufacture.

In accordance with the teachings of this invention an oil filter assembly includes a housing and a first (e.g., a primary or conventional) oil filter element disposed in proximity to a bottom portion of the housing. The first oil filter element contains an open inner volume, also referred to herein as a void. A second oil filter element having a generally circular cylindrical shape is disposed circumferentially about a length of the first oil filter element. The second oil filter element may be made of rolled cellulose such as paper, and filters particles of a smaller size than the first oil filter element. In further embodiments of this invention the second oil filter element can be comprised of other filtering media, such as glass wool, plastic, cotton, as well as combinations of two or more of these as well as other filtering media suitable for entrapping particles from the oil that are smaller than the particles entrapped by the primary oil filter element.

A first oil inlet is disposed at the bottom portion of the housing for providing oil to be filtered to side surfaces of the first oil filter element, wherein filtered oil flows through a thickness of the first oil filter element to the centrally located open inner volume, and from the centrally located open inner volume through an outlet of the filter housing.

A second oil inlet is also disposed at the bottom portion of the housing and surrounds the first oil inlet. The second oil inlet provides oil to be filtered to a bottom surface of the second oil filter element.

A fluid communication path is provided from a top surface of the second oil filter element into the open inner volume of the first oil filter element such that oil filtered through a length of the second oil filter element is mixed with the oil filtered by the first oil filter element.

The fluid communication path preferably includes an orifice providing passage for filtered oil into the open inner volume of the first oil filter element, where the orifice has an area that is significantly smaller than an area of the second oil inlet. For example, the ratio of the area of the second oil inlet to the area of the orifice is about 1:400 or greater (e.g., in a range of about 1:400 to about 1:2000, proportional to the size and capacity of the filter.).

In a preferred embodiment the fluid communication path further includes a third oil filter element disposed between the top surface of the second oil filter element and the orifice, wherein the third oil filter element also filters particles of a smaller size than the first oil filter element. The third oil filter element is disposed above the first oil filter element in a stacked arrangement, and the second oil filter element is disposed circumferentially about the length of the first oil filter element and the length of the third oil filter element.

In the presently preferred embodiment the pressure of the oil at the second inlet is x psi, the pressure of the oil at the outlet of the filter housing is about x psi minus about 2% to about 6%, and the pressure of the oil at the orifice is about x psi minus about 0.2% to about 0.8%.

Preferably the housing is form and fit compatible with a conventional spin-on oil filter.

The teachings of this invention thus provide a hybrid oil filter assembly that is form and fit compatible with a conventional spin-on oil filter assembly. The hybrid oil filter assembly includes a housing and contained within the housing is a first oil flow path containing a first oil filter element for filtering particles having a first minimum size, as well as a second oil flow path containing a second oil filter element that surrounds the first oil filter element along the length thereof. The second oil filter element filters particles having a second minimum particle size that is smaller than the first minimum particle size. Oil in the first oil flow path that has been filtered by the first oil filter element and oil in the second oil flow path that has been filtered (micro-filtered) by the second oil filter element are mixed together within a void contained within the first oil filter element before being discharged from the hybrid oil filter assembly.

In the hybrid oil filter the pressure of the oil at an inlet of both of the first and second oil flow paths is x psi, the pressure of the oil at an outlet of the first oil flow path is x psi minus about 2% to about 6%, and the pressure of the oil at an outlet of the second oil flow path is x psi minus about 0.2% to about 0.8%.

The teachings of this invention also provide a method for filtering engine oil during the operation of an internal combustion engine. The method includes steps of (a) pumping engine oil into an inlet of an oil filter assembly; (b) filtering a first portion of the engine oil by passing the engine oil through a first oil flow path containing a first oil filter element for retaining particles having a first minimum size; (c) micro-filtering a second portion of the engine oil by passing the engine oil through a second oil flow path containing a second oil filter element that surrounds the first oil filter element, the second oil filter element retaining particles having a second minimum particle size that is smaller than the first minimum particle size; (d) mixing together, within a mixing zone contained within the first oil filter element, the engine oil from the first oil flow path that has been filtered by the first oil filter element and the engine oil from the second oil flow path that has been micro-filtered by the second oil filter element; and (e) discharging the mixed filtered and micro-filtered engine oil from an outlet of the oil filter assembly into the engine.

During execution of the method the pressure of the engine oil at the inlet of oil filter assembly, and at an inlet of both of the first and second oil flow paths, is x psi, the pressure of the engine oil at the outlet of the oil filter assembly is x psi minus about 2% to about 6%, and the pressure of the engine oil at an outlet of the second oil flow path is x psi minus about 0.2% to about 0.8%.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

By way of introduction, a hybrid oil filter assembly (HOFA) integrates two filter systems into one spin-on filter housing, and may be used to replace the conventional spin-on oil filter assembly for internal combustion engines found in automobiles, vans, buses, trucks, heavy machine equipment, other internal combustion motor applications and hydraulic systems.

The HOFA can be mounted exactly the same as a normal, conventional spin-on oil filter. The HOFA can be implemented using the same form factors, sizes and threads as every other currently available spin-on filter.

A significant difference between the HOFA design and the conventional spin-on motor oil filter is an ability to filter the engine oil micro-fine clean. In practice, the filtered motor oil can become as clean or cleaner than new, unused motor oil. The cleaning process provides an ability to remove particles of size about one micron or greater. The micro-cleaned motor oil protects the movable engine parts and thus prolongs the active engine life. Furthermore, the normal oil change interval can be prolonged to, as an example, 15,000 miles or greater.

Figure 1:
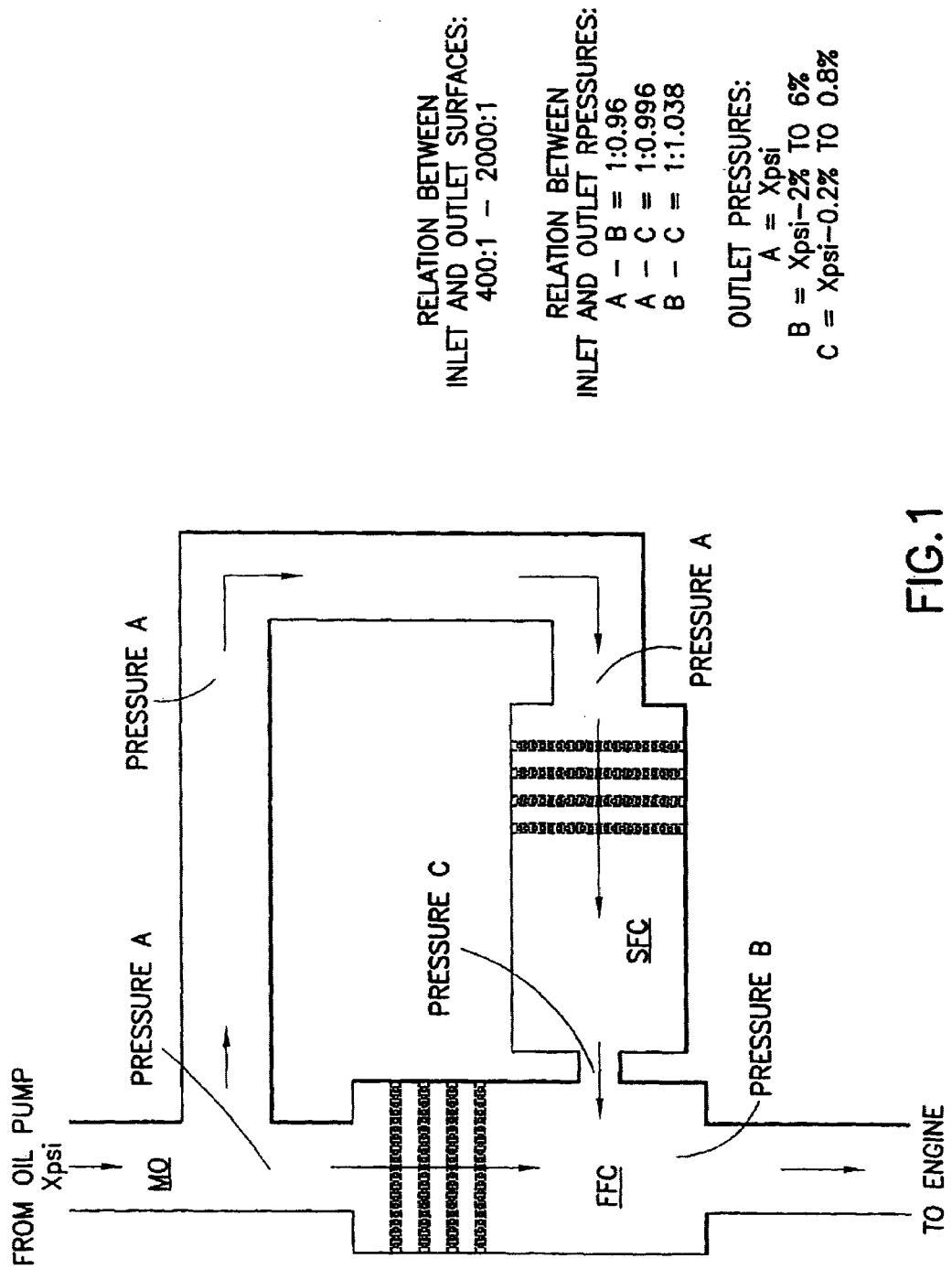
FIG. 1 is diagram depicting the oil flow paths and typical pressures of the hybrid oil filter assembly in accordance with the teachings of this invention.

Referring to FIG. 1, motor oil (MO) arrives from the motor oil pump of the engine and passes through holes in the bottom of the filter housing into the HOFA (Point A). Most of the oil enters a first oil flow path containing a first filter chamber (FFC), while a significantly smaller portion of the oil enters a second oil flow path containing a second filter chamber (SFC). The first oil filter chamber is substantially filled with a first (conventional) filter media, such as pleated paper, and is filtered in a conventional manner. By example, the first filter chamber removes particles down to a size of about 10 microns. The second filter chamber is substantially filled with a second filter media, such as rolled cellulose or paper, or glass wool, or plastic, or cotton, or mixtures of these and other filter materials, and is filtered (micro-filtered) so as to remove particles that are smaller in size than the particles removed in the first filter chamber. For example, the particles removed in the second filter chamber may be as small as about one micron. The oil pressure at the outlet of the second filter chamber (designated C) is about 0.2% to about 0.8% less than the inlet pressure of x psi at point A. The oil pressure at the outlet of the first filter chamber (designated B) is about 2% to about 6% less than the inlet pressure of x psi at point A. Since the filtered oil from the second filter chamber is injected under significant pressure into the first filter chamber, the interior volume of the first filter chamber also serves as a mixing zone wherein turbulent mixing occurs between the filtered oil in the first filter chamber (FFC) and the micro-filtered oil injected from the second filter chamber (SFC). Micro-filtered oil in the context of this invention includes oil that has been subjected to a filtering or cleaning operation wherein particles of a smaller size (e.g., down to about one micrometer) are retained than are retained in the primary or conventional oil filter element (e.g., about 10 micrometers).

FIG. 1 also shows the relationships between the inlet and outlet surface areas, and the relationships between the inlet and outlet pressures.

Figure 2:
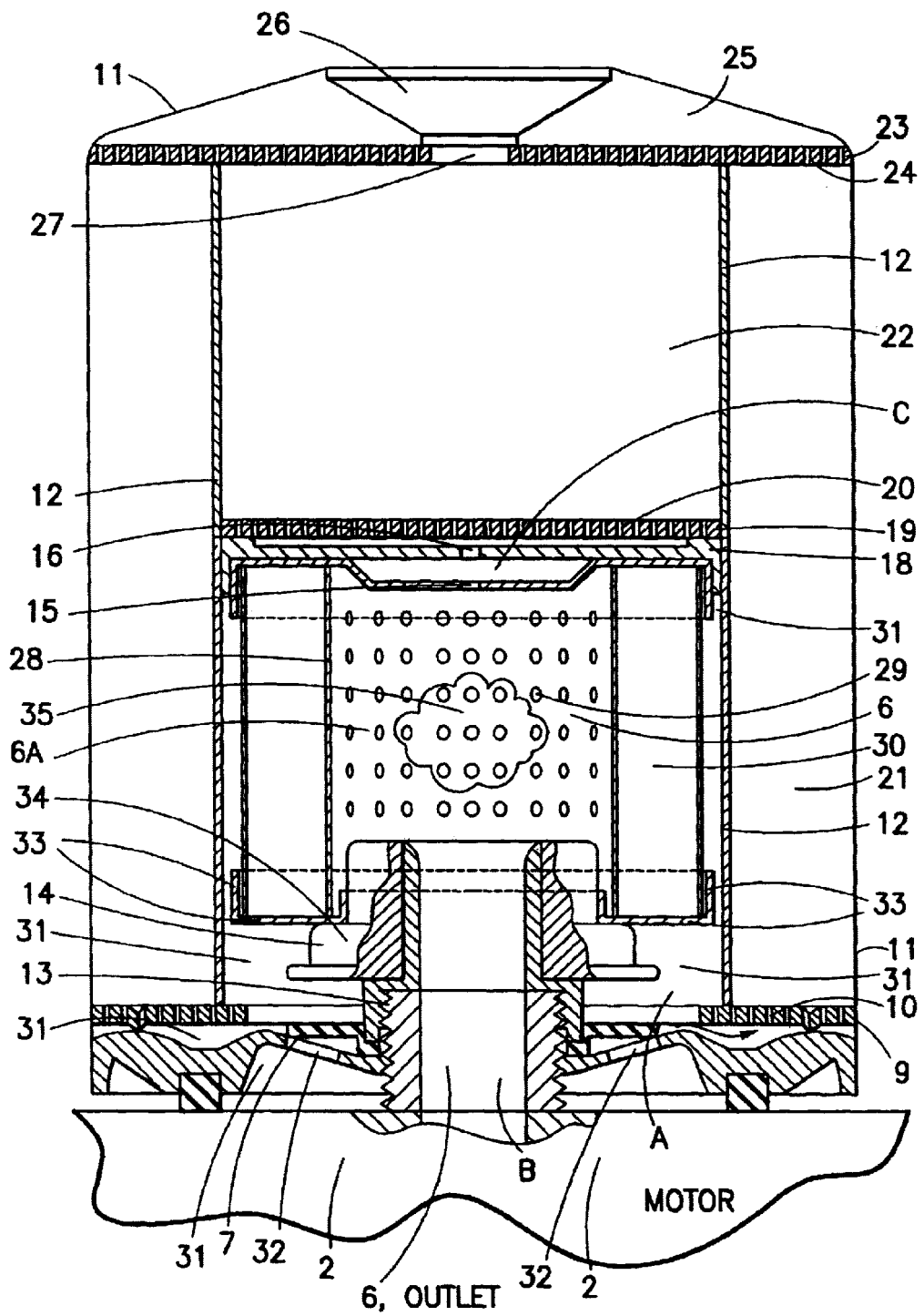
FIG. 2 is a cross-sectional view of one presently preferred embodiment of the hybrid oil filter assembly.
Figure 2A:
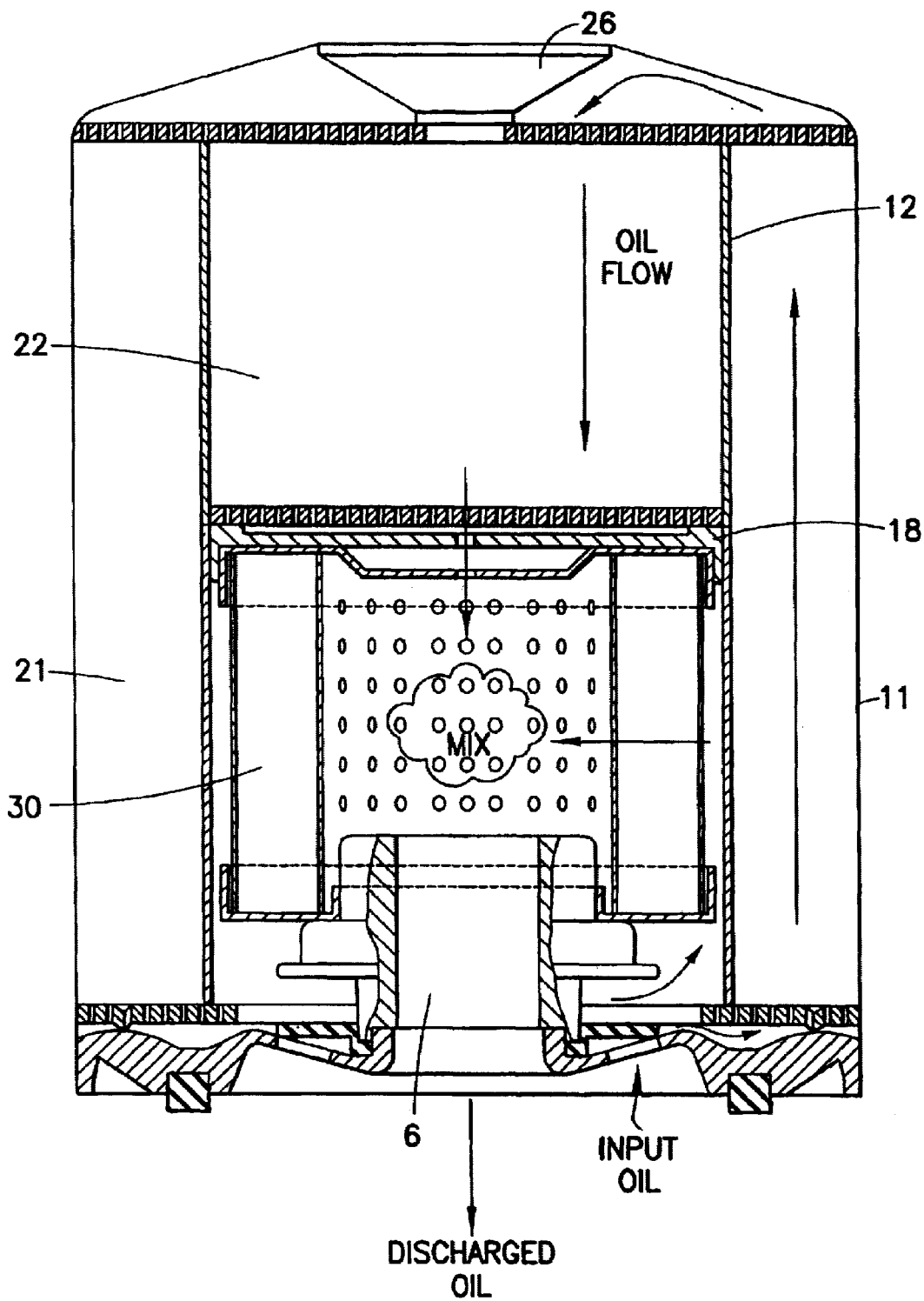
FIG. 2A is a simplified cross-sectional view of the embodiment of FIG. 2 with the internal filtering material removed so as to more clearly show the various inner volumes of the hybrid oil filter assembly.

Referring to FIGS. 2 and 2A, motor oil 2 arriving with high pressure from the engine's oil pump passes through holes 32 in the bottom of the filter housing. Oil fills all of the spaces 31 beneath and above the holes 32 before entering the filter housing 11 and encountering the two types of filter media.

One filter media is a filter element 30 which forms part of the normal or conventional filter. The filter element 30 may be a conventional pleated paper type of filter material. Filter element 30 rests in a collar 33 supported by an assembly 14 that includes a threaded insert 13 for engaging in a conventional manner threads that protrude from the motor housing. An oil holding valve 7 may be provided to limit oil spillage during filter spin-off.

A second filter media includes a first filter package embodied, in a preferred but not limiting embodiment, as a first micro-filter paper element or insert 21 that is positioned circumferentially about the first filter element 30, and is separated therefrom by a tube 12. The second filter media further may also include a second filter package embodied, in a preferred but not limiting embodiment, as a second micro-filter paper element or insert 22 positioned over the top of the normal filter element 30. In this case the tube 12 is longer than the filter element 30 and separates the two micro-filter elements or inserts 21, 22. Fluid communication between inserts 21 and 22 is made through an open space 25 at the top of the filter housing 11, and through a top outlet/inlet plate 23 having a plurality of holes 24. A spacer element 26 is placed between the top surface of the end of the filter housing 11 and the top plate 23 for urging the plate 23 against the top surfaces of the filter inserts 21 and 22. A bottom filter plate 19 having holes 20 is located beneath the second micro-filter element 22, above a back pressure valve 18, preferably made of silicone, which is disposed over the housing from filter 30 to provide a seal between all other filter mediums and oil chambers. The back pressure valve/seal has a centrally located orifice 16. Micro-filtered oil flows through the orifice 16 into the volume of the filter center 6A where it mixes with the oil filtered through the first filter media element 30.

In operation, the greatest volume of incoming oil passes through holes 32 to the side surfaces of the first filter media element 30, and the cleaned oil enters the space or void 6A at the center of the normal filter element 30. From here the cleaned oil flows to the bearings and other parts of the engine.

A smaller volume of oil passes through holes 10 of a main inlet plate 9 (see also FIGS. 4, 6, 7, 8), with the same pressure as the oil that passes into the filter element 30, and in through the filter elements 21 and 22. The oil passes to the bottom surface of the micro-filter element 21, through holes 24 of the upper outlet/inlet plate 23, through the length of the second filter element 21, and arrives at the space 25 at the top of the filter housing 11. The micro-fine filtered oil exits the space 25, passes through additional holes 24 of the upper plate 23, passes through the second micro-filter paper element or insert 22, passes through holes 19 in plate 20 to the back pressure valve 18 and flows out through the orifice 15 of the top collar of the first filter into the volume of the filter center region 6A. Once the micro-filtered oil arrives in the center region 6A of the normal filter portion the micro-fine filtered region is mixed with the normally filtered oil. The mixed clean oil then flows to the engine through the conduit or outlet 6.

The HOFA design employs a ratio of distribution of the oil and its pressure. More particularly, the HOFA operates based on the respective ratios of the different pressures in different parts of the filter, resulting from different oil flow volumes.

The incoming oil 2 from the oil pump flows under pressure into the filter housing 11 and passes through the two different filter media 21/22 and 30. The pressure on all surfaces is equal, i.e., on the surface of the normal filter element 30, on the surface of the micro-filter elements 21/22, and on the surface of the main inlet plate 9. The oil passes relatively quickly through the pleats of the normal filter element 30, but requires significantly more time to pass through the finer texture of the micro-filter elements 21/22. In a presently preferred embodiment the micro-filter elements 21 and 22 are tightly rolled paper. The paper may be similar to that of bathroom tissue, but may be manufactured for use in the HOFA. As a consequence about 95% of the incoming oil 2 passes through the normal filter element 30 and the cleaned oil flows out of conduit 6, at lower pressure, in the direction of the engine. Meanwhile, the same incoming pressure forces about 5% of the incoming oil 2 through the micro-filter element 21, through the space 25 above the micro-filter element 21, through the upper outlet/inlet plate 23, through micro-filter element 22, through the back pressure valve 18 and then through the outlet orifice 15. This micro-filtered oil mixes at open area 35 in the void 6A with the normally filtered oil that passes through normal filter element 30, and thus joins the filtered oil passing through conduit 6 into the engine. Over time, all of the engine oil will pass through the micro-filter elements 21 and 22, and particles smaller than those trapped in the normal filter element 30 are retained and filtered out of the oil stream, which is the desired result.

Based on the determined ratios between oil pressure, inflow volume, outflow volume, inlet surface and outlet surface in the micro-filter portion of the HOFA, the micro-filtered oil flows through the outlet orifice 15 with a higher pressure than the pressure of the oil within the normal filter portion. Since the incoming oil volume cannot flow out at the same time through the orifice 15 at the top of the normal filter portion, consequently it forms a high oil pressure inside and around the micro-filter element inserts 21 and 22, which has typically the same oil pressure as the pressure in the line coming from the oil pump. The result is that the micro-filter element inserts 21 and 22 are constantly immersed in the oil, and the microscopic pores stay open and do not become compressed. The oil flow is thus normal in all directions within the cellulose package (micro-filter element inserts 21 and 22), and particles of size about one micron and greater are captured and retained in the filter element inserts 21 and 22. In the presently preferred, but not limiting, embodiment the ratio between the inlet area and the outlet area is about 400:1 at a pressure ratio of about 1:0.996.

Contrary to the micro-filter portion, the difference between the inlet and outlet pressure of the normal full flow filter 30 is greater than the difference between the inlet pressure and the outlet pressure of the micro-fine filter elements 21 and 22. This is true because the resistance in the engine is less than at the outflow orifice in the micro-filter portion. A reason for this behavior relates to the resistance of the engine oil exiting the micro-filter portion at orifice 15. The ratio between inlet and outlet pressure of the full flow filter 30 is about 1:0.96.

The above explanation of the different behaviors of the two filtering zones within the filter is an important consideration in explaining the operation of the filter. The pressure differential causes the high pressure micro-fine cleaned oil to exit from the space 25 at the top of the filter housing 11, to be forced through the micro-filter media 22 and through the orifice 15 in order to be mixed with the cleaned oil within the mixing volume 6A of the normal filter 30.

FIGS. 3–12, illustrating various components that were described above, provide further details of the placement of the components, their shapes, and the construction of the HOFA.

In the illustrated embodiment the filter housing 11 has a total length of about 130 mm and a diameter of about 93 mm. The thickness of the micro-filter insert 21 is about 13.5 mm, the diameter of the micro-filter element 22 is about 62 mm, the diameter of the normal filter element 30 is about 55 mm, and the diameter of the central volume 6A is about 35 mm. The diameter of the orifice 15 is about 3.0 mm, and the ratio of total inlet area (the holes 10 in the inlet plate 9) to the orifice 15 is about 1:400. The length of the first micro-filter element 21 is about 110 mm, the length of the second micro-filter element 22 is about 45 mm, and length of the conventional oil filter element 30 is also about 45 mm.

In one embodiment the fluid communication path comprises an orifice providing passage for filtered oil into the open inner volume of the first oil filter element; the orifice having a flow path area that is smaller than a flow path area of said second oil inlet. In one embodiment a ratio of the area of the second oil inlet to the area of said orifice is about 400:1 or greater.

The foregoing and other dimensions, materials, pressures and the like are exemplary, and are not to be construed as being a limitation upon the practice of this invention.

Figure 2B:
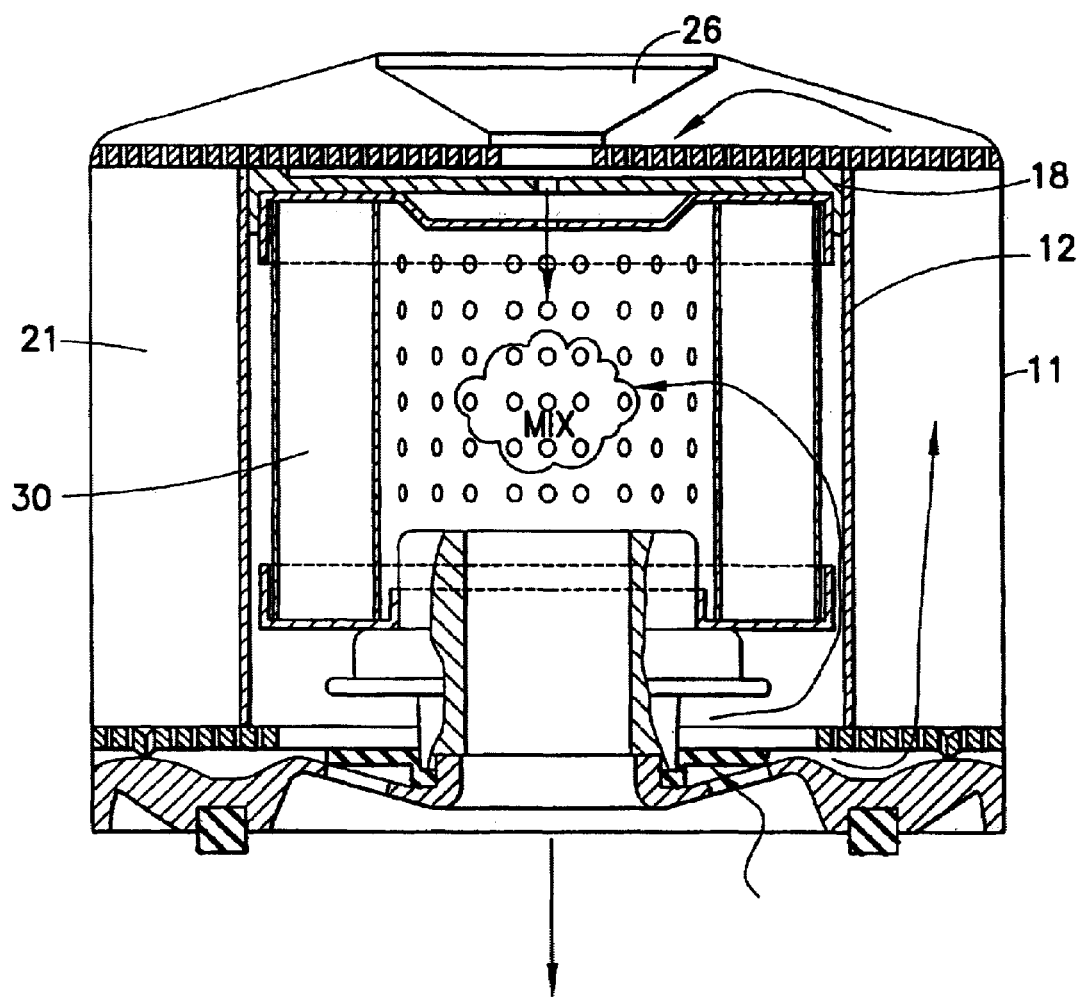
FIG. 2B is a cross-sectional view of another presently preferred embodiment of the hybrid oil filter assembly.
Figure 3:
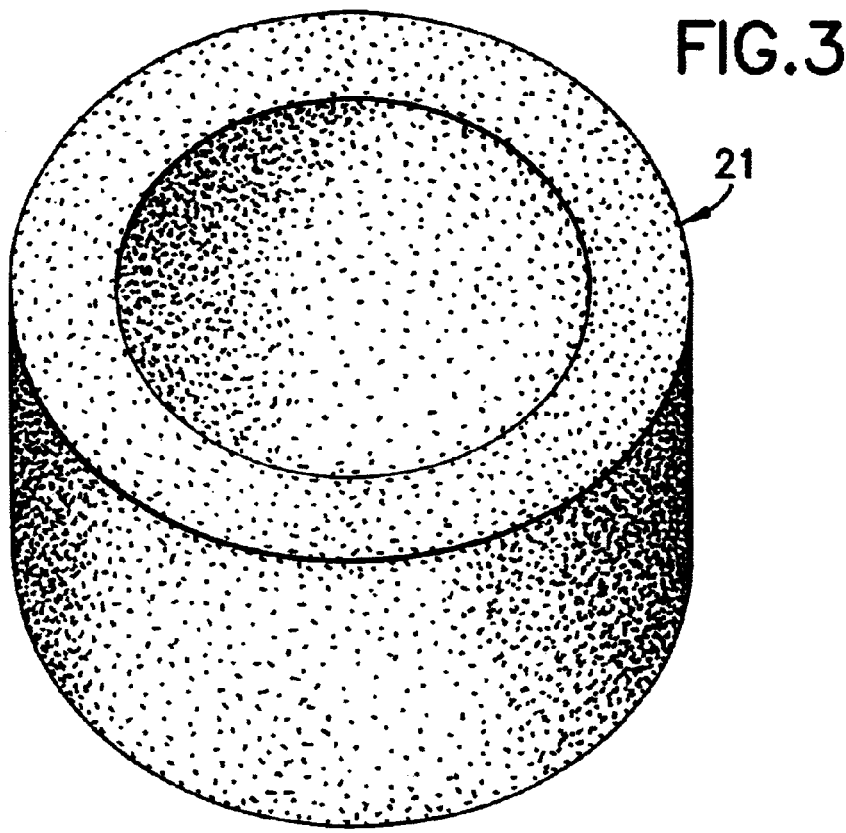
FIG. 3 is an elevational view of a first micro-filter element insert.
Figure 4:
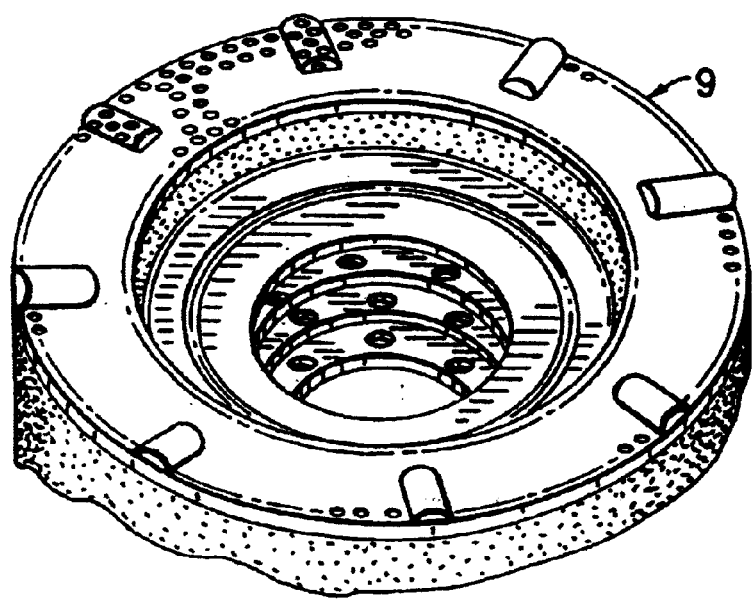
FIG. 4 is a bottom view (looking from the motor) of the normal filter element and the main inlet plate.
Figure 5:
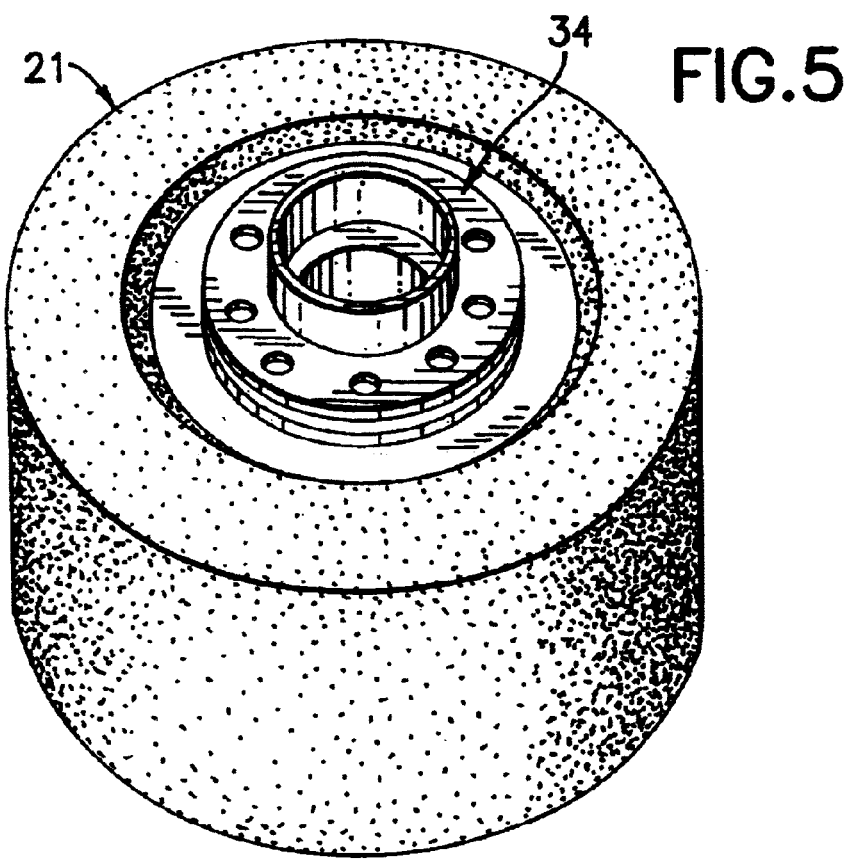
FIG. 5 is a bottom view showing a bypass valve in position.
Figure 6:
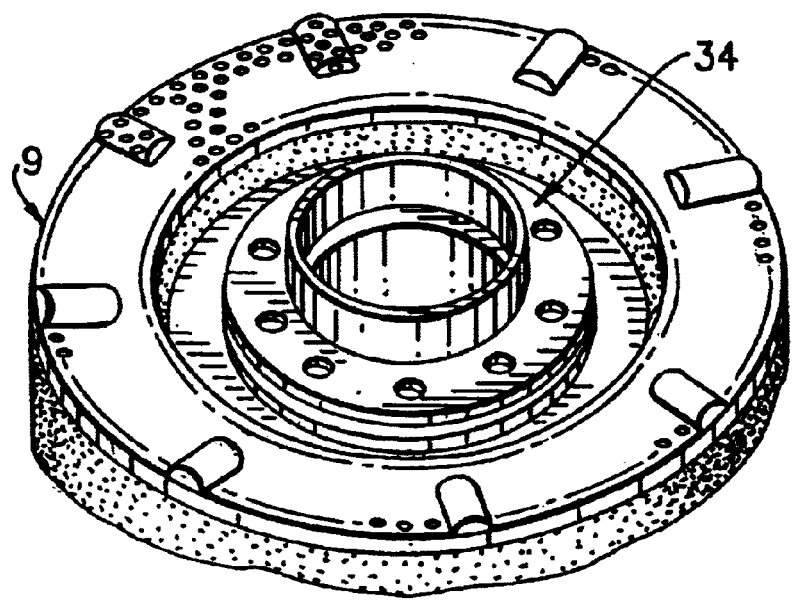
FIG. 6 is a bottom view showing in greater detail the oil inlet to the normal filter and the oil inlet to the micro-filter, including the bypass valve.
Figure 7:
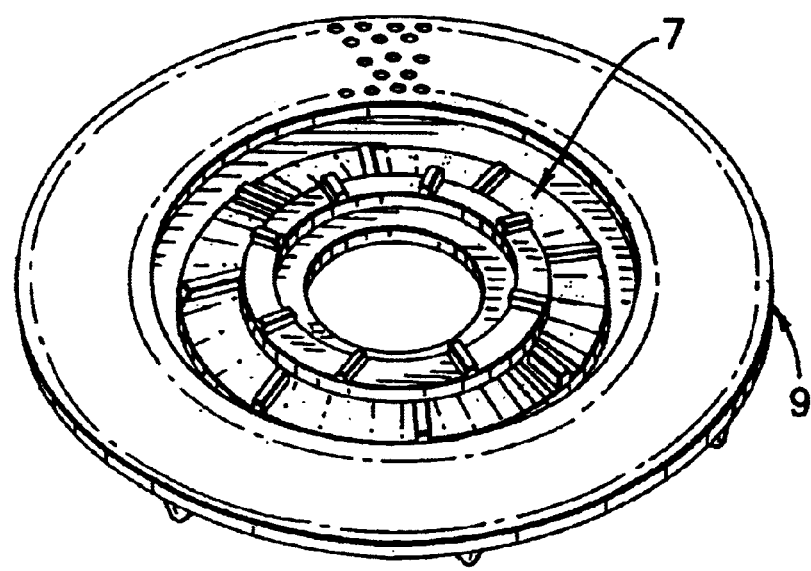
FIG. 7 is a top view of an oil holding valve and the surrounding inlet plate to the micro-filter insert.
Figure 8:
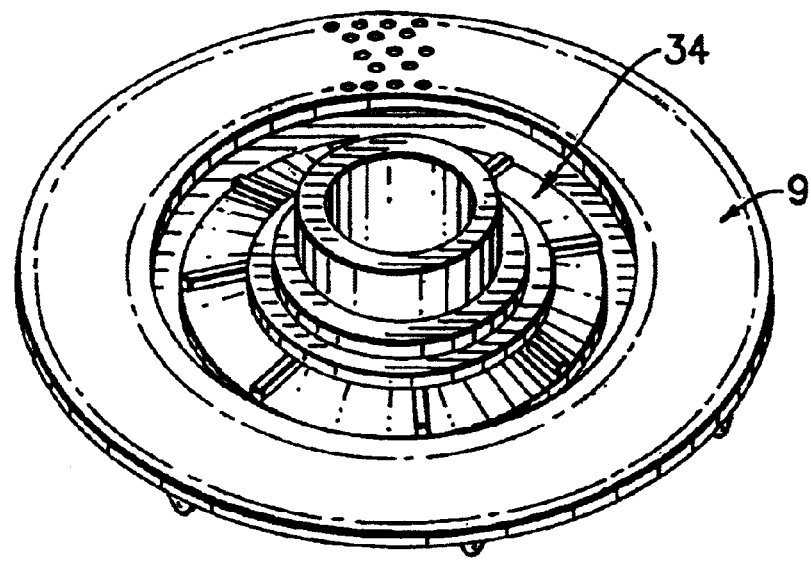
FIG. 8 is a top view of the oil holding valve and the surrounding inlet plate to the micro-filter insert, as well as the bypass valve positioned over the oil holding valve.
Figure 9:
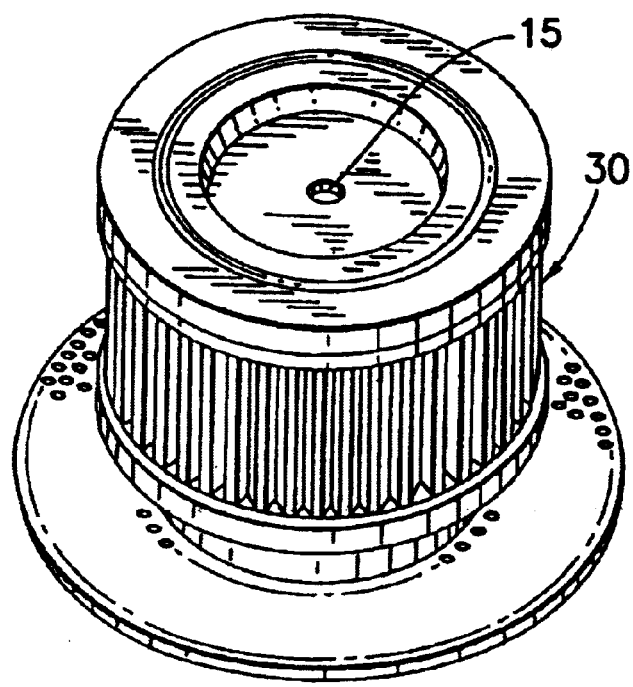
FIG. 9 is a top view depicting the normal oil filter element that contains an orifice providing fluid communication between the high pressure micro-filtering portion and the lower pressure normal filtering portion.
Figure 10:
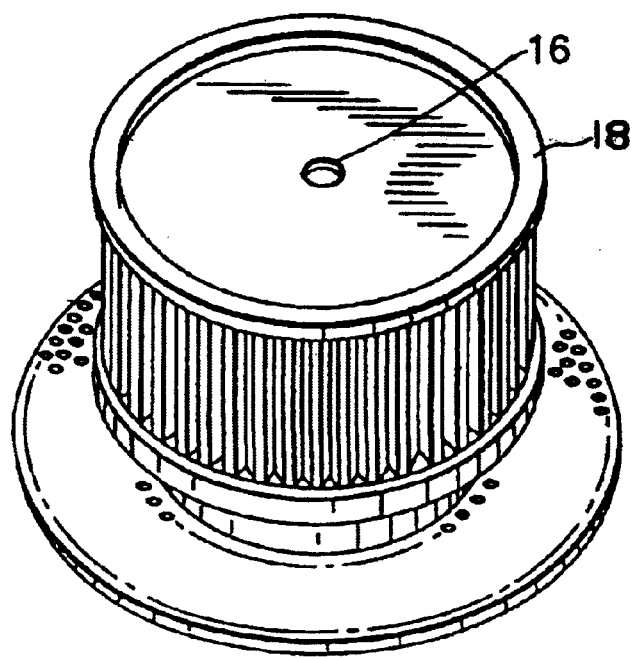
FIG. 10 shows a back pressure valve and seal between the normal filter, the inside of a micro-filter tube and an upper outlet/inlet plate.
Figure 11:
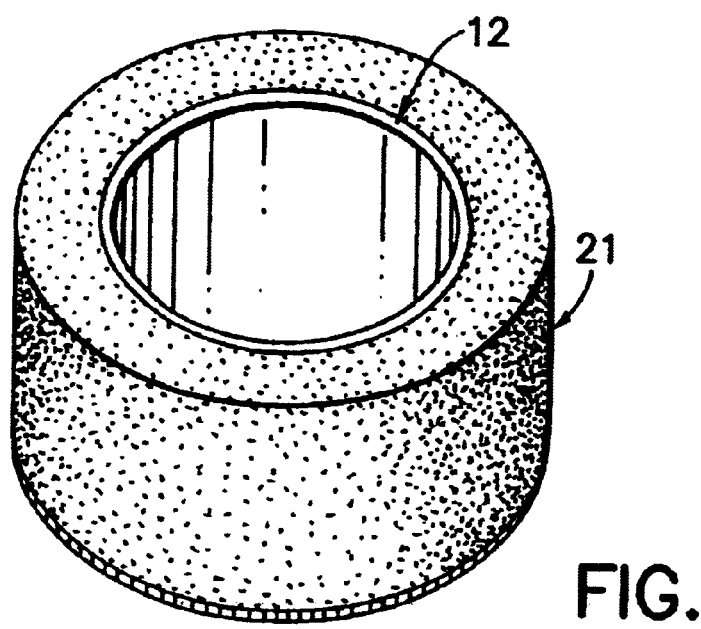
FIG. 11 is a top view of the outer micro-filter element.
Figure 12:
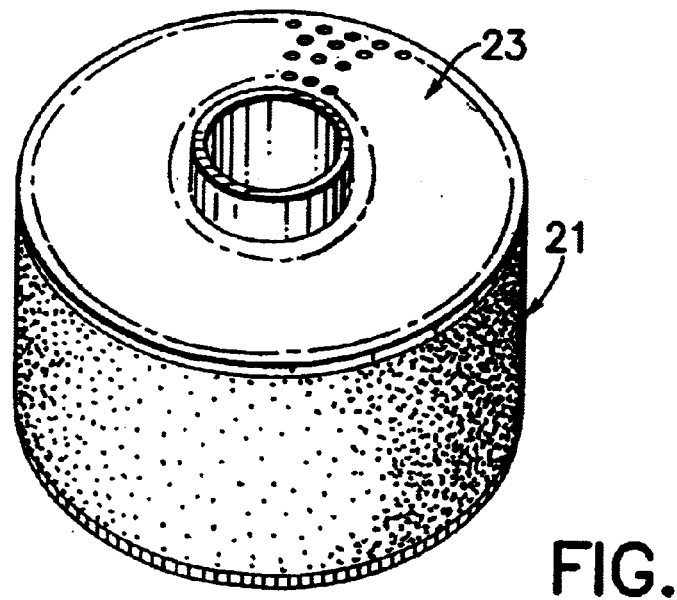
FIG. 12 is a top view of the outer micro-filter element having the upper outlet/inlet plate in position.

In further embodiments of this invention it can be appreciated that the overall length of the filter housing 11 could be reduced by a factor of about two by eliminating the second micro-fine filter element 22, and by making the length of the first micro-fine filter element 21 and the tube 12 about equal to the length of the normal filter element 30. This embodiment of the HOFA is depicted in a simplified form in FIG. 2B.

Figure 13:
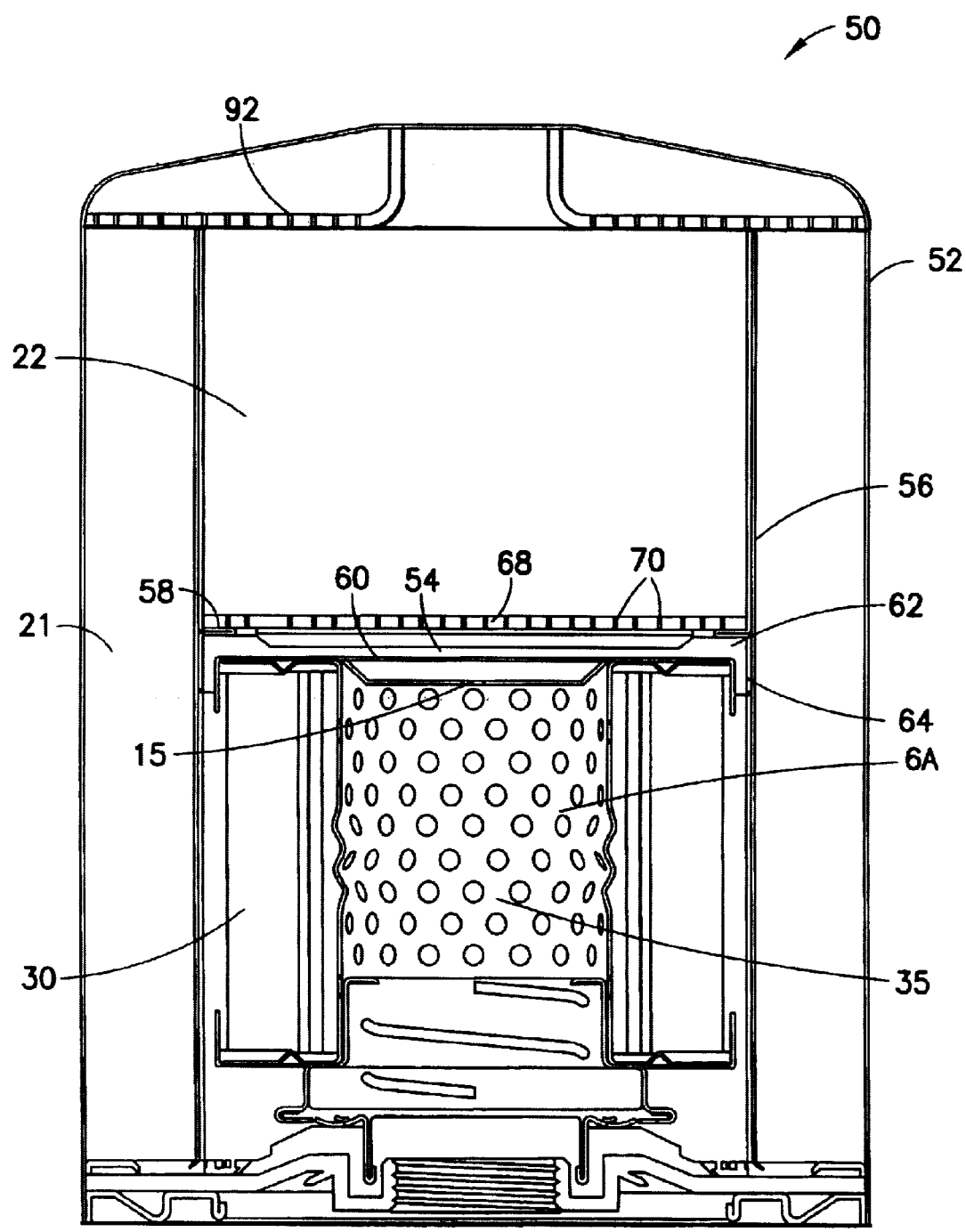
FIG. 13 is a schematic cross sectional view of an alternate embodiment of the filter assembly incorporating features of the present invention.

Referring now to FIG. 13, an alternate embodiment of the filter assembly is shown. In this embodiment, the filter assembly 50 generally comprises a housing 52, the first filter element 30, the second filter element comprising the first and second filter members 21, 22, and a flutter valve 54. The housing 52 is identical to the housing in the first embodiment shown in FIG. 2 with the exception of the tube 12. The tube 56, which replaces the tube 12, has a general tubular shape and surrounds the first filter element 30 and the second member 22 of the second filter element. The tube 56 comprises an inwardly extending rim 58 formed by a fold in the tube 56. The rim 58 forms two opposite surfaces which the flutter valve 54 and an outlet plate 68 at the exit from the second flow path are positioned against.

Figure 14:
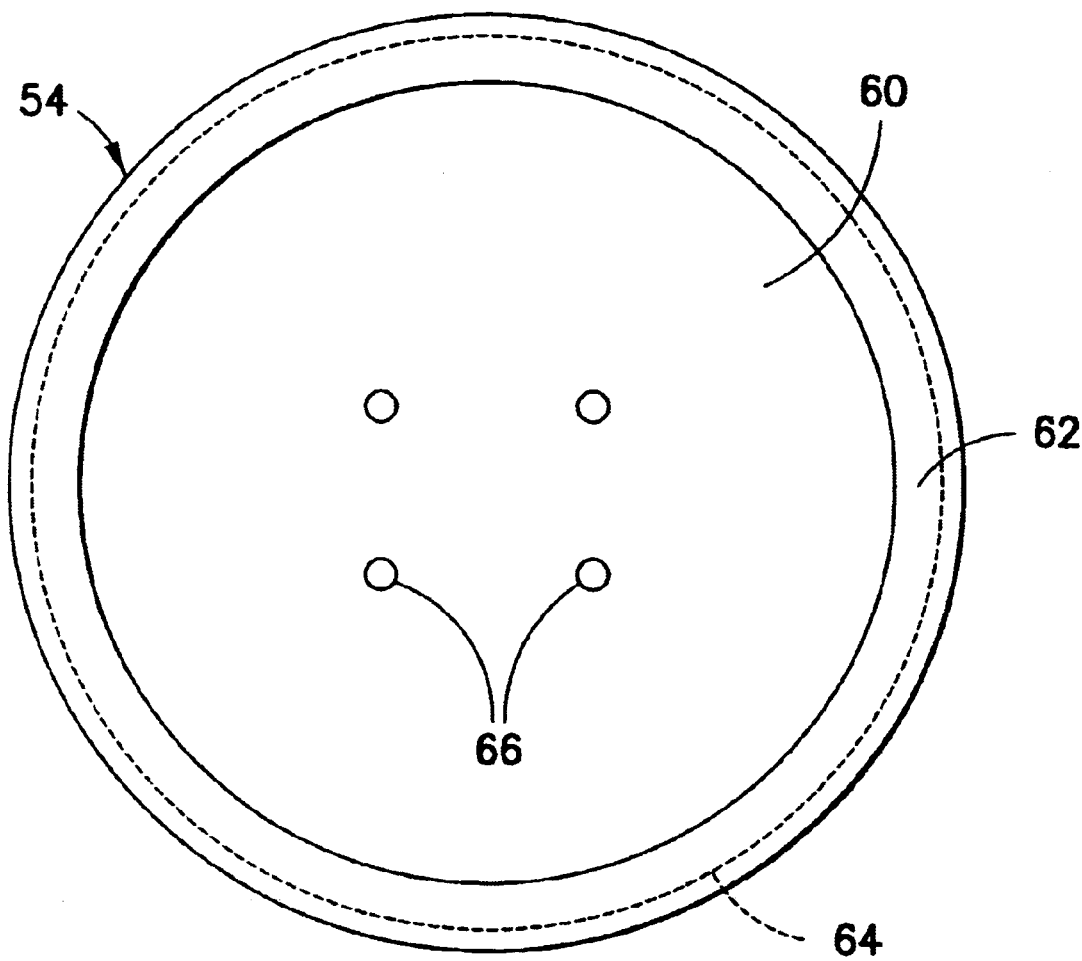
FIG. 14 is a top plan view of the flutter valve used in the filter assembly shown in FIG. 13.

Referring also to FIG. 14, a top plan view of the flutter valve 54 is shown. The flutter valve 54 is preferably comprised of Silicon and is resiliently deflectable. The flutter valve 54 generally comprises a center section 60, an enlarged thickness outer portion 62, and a downwardly extending rim 64. The center section 60 comprises holes 66 therethrough. In the embodiment shown, the center section 60 comprises four holes 66. However, in alternate embodiments, the center section 60 could comprise more or less than the four holes. In addition, the holes could be arranged in any suitable array. However, in a preferred embodiment, the holes 66 are offset from the center of the flutter valve 54.

Similar to the plate 19 in the embodiment shown in FIG. 2, the filter assembly 50 comprises the plate 68 located at the bottom of the second member 22 of the second filter element. The plate 68 is supported on one side of the rim 58. The plate 68 comprises holes 70 which passed through the plate.

The first filter element 30 is provided as a unitary member with a supporting frame 72. The filter element 30 and supporting frame 72 can comprise a conventional subassembly as known in the art. The top of the supporting frame 72 comprises a recessed section which extends towards the void 6A in the open area 35. The top of the supporting frame 72 is substantially closed except for a center aperture 15. In the embodiment shown, the holes 66 of the flutter valve 54 are offset or not aligned with the center aperture 15. The holes 66 of the flutter valve 54 are also offset or not aligned with the holes 70 in the plate 68.

The outer portion 62 of the flutter valve 54 forms a seal between the top of the supporting frame 72 and the rim 58 of the tube 56. The rim 64 of the flutter valve 54 also extends down along the side of the supporting frame 72 and forms a seal therewith.

FIG. 13 shows the flutter valve at a home position. In the home position the center section 60 is spaced from the bottom surface of the plate 68 and is spaced from the recessed section of the top of the supporting frame 72 having the outlet orifice 15. The flutter valve 54 is maintained at this home position when there is no fluid pressure differential on opposite top and bottom sides of the flutter valve. This occurs when the engine is at rest, or when the engine is at a steady state of operation.

Figure 15:
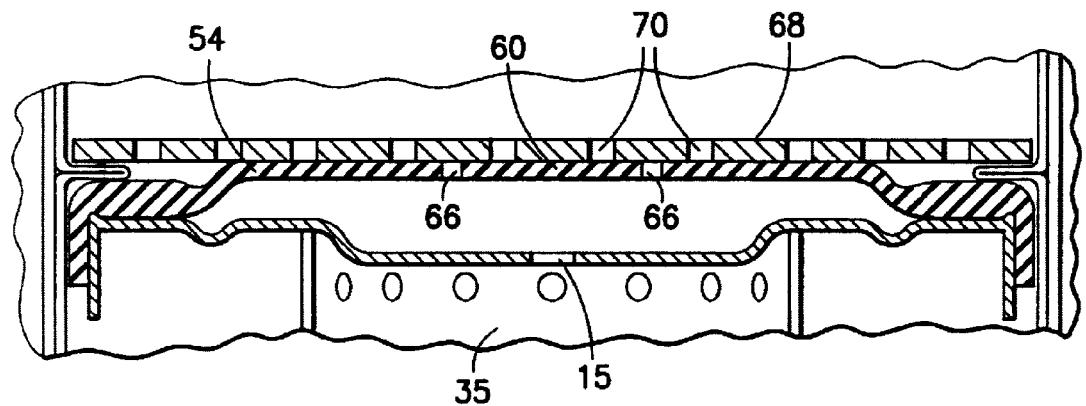
FIG. 15 is an enlarged partial cross sectional view of the filter assembly shown in FIG. 13 with the flutter valve moved to a first closed position.
Figure 16:
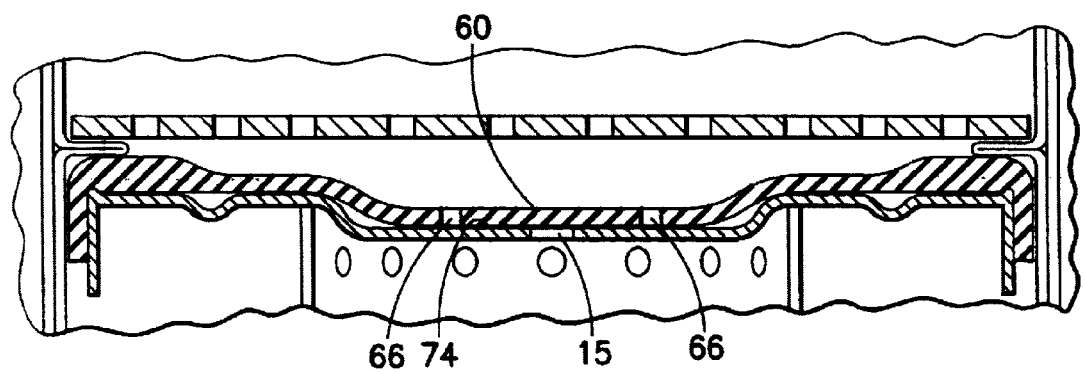
FIG. 16 is an enlarged partial cross sectional view as in FIG. 15 with the flutter valve moved to a second closed position.

Referring also to FIGS. 15 and 16, the flutter valve is shown at two other positions. In the position shown in FIG. 15, the flutter valve 54 has its center section 60 moved to an up position. In this up position, the top surface of the center section 60 contacts the bottom surface of the plate 68. Because the holes 66 in the center section 60 are not aligned with the holes 70 in the plate 68, the holes 66 become blocked by the plate 68. Thus, oil is prevented from flowing through the holes 66.

The position of the flutter valve 54 shown in FIG. 15 occurs when the engine is initially started and, during periods of engine acceleration. More specifically, when there is an increase in oil pressure at the holes 32, such as when starting the engine or during engine acceleration, oil pressure will increase in the open space 35 faster than oil pressure will increase at the outlet from the second filter element proximate the holes 70. This is because there is a time difference or time differential between the transmission of the increased pressure through the second filter element 21, 22 verses the transmission of the increased pressure through the first filter element 30. Because the holes 66 are offset from the orifice 15, the flow of oil upward through orifice 15 initially presses against a portion of the center section 60 which does not have the holes 66. Thus, this initial force moves the center section upward faster than if one of the holes 66 was located directly above the orifice 15.

The second filter element 21, 22, because of its finer filtering capability (smaller pore size), is slower to transmit the increased oil pressure therethrough. This time differential between pressure transmission through the two filters 21, 22 and 30, causes a pressure differential between the open space 35 and the exit from the second member 22 of the second filter element at holes 70. Thus, oil flows from the open space 35 through the orifice 15 in an upward direction towards the flutter valve 54.

Because the center section 60 of the flutter valve 54 is deflectable, as the oil passes through the orifice 15 it presses against the center of the center section 60 and pushes the center section 60 upward against the plate 68. This causes the holes 66 to be closed by the plate 68 and substantially prevents the oil from flowing through the holes 70 and into the second member 22 of the second filter element in a reverse direction. In other words, the flutter valve 54 functions as a check valve to prevent a flow of oil through the holes 70 in a reverse direction. Thus, the second filter element is substantially prevented from receiving oil which has been filtered by the first filter element 30 directly from the open space 35. This allows a greater percentage of oil to be filtered by the second filter element 21, 22 entering the holes 32 than would otherwise be provided if the flutter valve was not present.

When the oil pressure on opposite sides of the plate 68 approaches equalization, the center section 60 of the flutter valve 54 can return back to its home position shown in FIG. 13. This return is due to the flutter valve's own internal resiliency. Oil filtered by the second filter element 21, 22 can now flow through the holes 70, through the holes 66, and out the orifice 15 to be mixed with oil filtered by the first filter element 30 in the open space 35.

FIG. 16 shows the center section 60 of the flutter valve 54 in a down position. In this down position the bottom surface of the center section 60 is located against the top surface 74 of the recessed section of the supporting frame 72. Because the holes 66 in the center section 60 are not aligned with the hole 15 in the supporting frame 72, the holes 66 become blocked by the plate top surface 74. Thus, oil is prevented from flowing through the holes 66 and hole 15.

The position of the flutter valve 54 shown in FIG. 16 occurs is during periods of engine deceleration. More specifically, when there is a decrease in oil pressure at the holes 32, oil pressure will decrease in the open space 35 faster than oil pressure will decrease at the outlet from the second filter element proximate the holes 70. This is because there is a time differential between the transmission of the decreased pressure through the second filter element 21, 22 verses the transmission of the decreased pressure through the first filter element 30. The second filter element 21, 22, because of its finer filtering capability, is slower to transmit the decreased oil pressure therethrough. This causes a pressure differential between the open space 35 and the exit from the second member 22 of the second filter element. Thus, oil flows through holes 70 faster that oil flows out of the open space 35.

Because the center section 60 of the flutter valve 54 is deflectable, as the oil passes through the holes 70 it presses against the center section 60 and pushes the center section 60 downward against the top surface 74. This causes the holes 66 to be closed by the top surface 74 and prevents the oil from flowing through the hole 15 and into the open area 35. In other words, the flutter valve 54 functions as a speed control valve or pressure differential control valve to prevent a flow of oil through the holes 70 too fast. Thus, the second filter element is substantially prevented from decreasing the pressure of oil in the second filter element too fast. This allows slower pressure fluctuations in the second filter element than would otherwise be provided if the flutter valve was not present and, faster resumption of filtering by the second filter element after the engine accelerates again or obtains a steady state. The first filter element 30 is always working during operation of the engine regardless of whether or not a path through the second filter element 21, 22 is open or closed by the flutter valve.

When the oil pressure on opposite sides of the center section 60 of the flutter valve 54 approaches equalization, the center section 60 of the flutter valve 54 can return back to its home position shown in FIG. 13. This return is due to the flutter valve's own internal resiliency. Oil filtered by the second filter element 21, 22 can now flow through the holes 70, through the holes 66, and out the orifice 15 to be mixed with oil filtered by the first filter element 30 in the open space 35. In an alternate embodiment, the supporting frame 72 could have more than one orifice 15 and, one or more of the orifice(s) could be aligned with one or more of the holes 66, such as when the holes 66 are smaller than the orifice(s).

Figure 17:
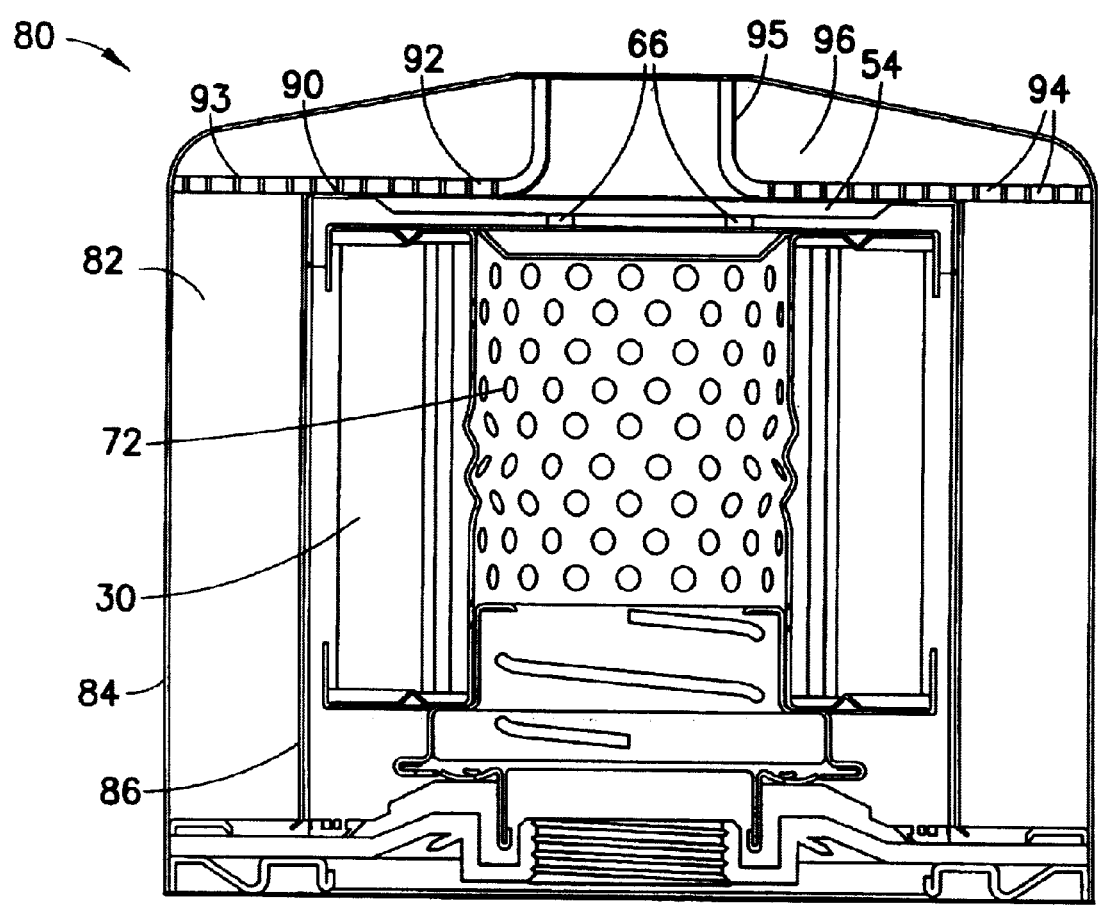
FIG. 17 is a schematic cross sectional view of another alternate embodiment of the filter assembly of the present invention.

Referring now also to FIG. 17, another alternate embodiment of the present invention is shown. The filter assembly 80 has a smaller height than the filter assembly 50 shown in FIG. 13. The filter assembly 80 does not comprise the second member 22 of the second filter element. In addition, the first filter element 82 has a smaller height then the first member 21 of the second filter element shown in FIG. 13.

In this embodiment, the filter assembly 80 generally comprises the first filter element 30 the supporting frame 72, a second filter element 82 and a housing 84. The housing 84 includes a tube 86 which surrounds the first filter element 30 and the supporting frame 72. A top of the tube 86 comprises a lip 90. The flutter valve 54 is sandwiched between the top of the supporting frame 72 and the bottom surface of the lip 90. The housing 84 includes a member 92. The housing member 92 comprises a plate section 93 and a spacer section 95. The plate section 93 comprises holes 94 through the housing member. The holes 94 allow oil to pass through the top of the second filter element 82 into a space 96 and through the holes 94 towards the top side of the flutter valve 54.

The flutter valve 54 for the embodiment shown engine FIG. 17 functions in the same way as the flutter valve described with reference to FIGS. 13–16. The housing member 92 is the same as the housing member 92 used in the embodiment shown in FIG. 13. In addition, the first filter element 30 and supporting frame 72 are the same as those used in the embodiment shown in FIG. 13. Thus, the alternate embodiment of FIG. 17 illustrates that components, such as the housing member 92, first filter element 30, and supporting frame 72, can be used in different embodiments.

In accordance with one aspect of the present invention, a hybrid oil filter assembly is provided comprising a housing forming a first oil flow path and a second oil flow path; a first oil filter element 30 for filtering particles having a first minimum size, the first oil filter element being located in the first oil flow path; and a second oil filter element 21, 22 that surrounds the first oil filter element 30 along a portion of the length thereof, the second oil filter element 21, 22 being located in the second oil flow path for filtering particles having a second minimum particle size that is smaller than the first minimum particle size. Oil in the first oil flow path that has been filtered by the first oil filter element 30 and oil in the second oil flow path that has been filtered by the second oil filter element 21, 22, but not filtered by the first filter 30, first begin to mix together within a void 6A contained within the first oil filter element 30 before being discharged from the hybrid oil filter assembly.

In accordance with another aspect of the present invention, a liquid filter assembly is provided comprising a first liquid filter element 30; a second liquid filter element 21, 22; and a housing having the first and second liquid filter elements therein, and a plate 23 located along a top side of the second filter element and proximate a top of the housing, the plate having holes 24 therethrough; a threaded motor engaging assembly connected to a bottom of the housing. The housing and filter elements form a plurality of partially separate liquid flow paths. The first filter element 30 is located in a first one of the flow paths. The second filter element 21, 22 is located in a second one of the flow paths. A portion 21 of the second filter element surrounds a portion of the first filter element 30. The second filter element 21, 22 comprises a top side surface along a bottom side of the plate 23 which forms a filtered liquid exit from the portion 21 of the second filter element through the holes in the plate.

In accordance with another aspect of the present invention, a liquid filter assembly is provided comprising a first liquid filter element 30; a second liquid filter element 21, 22; and a housing having the first and second liquid filter elements therein. The housing and filter elements form at least partially separate liquid flow paths. The first filter element is located in a first one of the flow paths. The second filter element is located in a second one of the flow paths. At least a portion 21 of second filter element surrounds at least a portion of the first filter element 30. The first and second liquid flow paths begin to merge in an open space 35 at a center of the first liquid filter element 30.

In accordance with another aspect of the present invention, a liquid filter assembly is provided comprising a first liquid filter element 30 adapted to filter particles larger than a first size; a second different liquid filter element 21, 22 adapted to filter particles larger than a second size, the second size being smaller than the first size; and a housing having the first and second liquid filter elements therein, the housing forming a first liquid flow path having the first liquid filter element therein, and a second liquid flow path having the second liquid filter element therein. The first and second liquid flow paths share a common inlet pressure of liquid entering into the housing. Liquid from an outlet of the first liquid flow path and liquid from an outlet of the second liquid flow path combine at a mixing area 35, wherein the filter assembly comprises a liquid flow path restriction orifice 15 proximate the outlet of the second liquid flow path such that liquid pressure at the orifice 15 approximate the outlet of the second liquid flow path is larger relative to liquid pressure at the outlet of the first liquid flow path into the mixing area 35. The first and second liquid flow paths begin to merge in the open 35 space in a center of the first filter element 30.

While the invention has been particularly shown and described with respect to preferred embodiments thereof, it will be understood by those skilled in the art that changes in form and details may be made therein without departing from the scope and spirit of the invention.

What is claimed is:

1. A hybrid oil filter assembly comprising:
a housing forming a first oil flow path and a second oil flow path;
a first oil filter element for filtering particles having a first minimum size, said first oil filter element being located in the first oil flow path; and
a second oil filter element that surrounds said first oil filter element along a portion of the length thereof, said second oil filter element being located in said second oil flow path for filtering particles having a second minimum size that is smaller than said first minimum size,
wherein oil in said first oil flow path that has been filtered by said first oil filter element and oil in said second oil flow path that has been filtered by said second oil filter element, but not filtered by said first filter, first begin to mix together within a void contained within said first oil filter element before being discharged from said hybrid oil filter assembly.

2. A hybrid oil filter assembly as in claim 1 further comprising a flutter valve located between an output from the second oil filter element and the void.

3. A hybrid oil filter assembly as in claim 2 wherein the output from the second oil filter element comprises a plate with holes through the plate.

4. A hybrid oil filter assembly as in claim 3 wherein the flutter valve comprises a plurality of holes which are not aligned with the holes of the plate, and wherein the flutter valve can move against the plate to close the holes of the flutter valve relative to the holes of the plate.

5. A hybrid oil filter assembly as in claim 4 further comprising a supporting frame member between the flutter valve and the void, wherein the supporting frame member comprises a hole therethrough, and wherein the hole in the supporting frame member is not aligned with the holes in the flutter valve, and wherein the flutter valve can move against the supporting frame member to close the holes of the the flutter valve relative to the hole of the supporting frame member.

6. A hybrid oil filter assembly as in claim 1 wherein the second oil filter element comprises a first filter member (21) and a second filter member (22), wherein the first filter member surrounds portions of the second filter member and the first oil filter element.

7. A hybrid oil filter assembly as in claim 6 wherein the housing comprises a housing member having a general tube shape which surrounds portions of the second filter member and the first oil filter element, and does not surround the first filter member of the second oil filter element.

8. A hybrid oil filter assembly as in claim 7, further comprising a flutter valve and an outlet plate from the second oil flow path, wherein the housing member comprises an inwardly extending rim formed by a fold in the housing member, and wherein the rim forms opposite surfaces which the the flutter valve and the outlet plate are respectively positioned against.

9. A liquid filter assembly comprising:
a first liquid filter element;
a second liquid filter element;
and a housing having the first and second liquid filter elements therein, and a plate located along a top side of the second filter element and proximate a top of the housing, the plate having holes therethrough;
a threaded motor engaging assembly connected to a bottom of the housing,
wherein the housing and filter elements form a plurality of partially separate liquid flow paths, wherein the first filter element is located in a first one of the flow paths; wherein the second filter element is located in a second one of the flow paths, wherein the second filter element surrounds a portion of the first filter element, and wherein the second filter element comprises a top side surface along a bottom side of the plate which a filtered liquid can flow through the holes in the plate.

10. A liquid filter assembly as in claim 9 further comprising a flutter valve located between the filtered liquid exit from the second filter element and an enlarged void located in a center of the first liquid filter element.

11. A liquid filter assembly as in claim 10 wherein the plate comprises a plurality of holes, wherein the flutter valve comprises a plurality of holes which are not aligned with the holes of the plate, and wherein the flutter valve can move against the plate to close the holes of the flutter valve relative to the holes of the plate.

12. A liquid filter assembly as in claim 11 further comprising a supporting frame member between the flutter valve and the void, wherein the supporting frame member comprises a hole therethrough, and wherein the hole in the supporting frame member is not aligned with the holes in the flutter valve, and wherein the flutter valve can move against the supporting frame member to close the holes of the flutter valve relative to the hole of the supporting frame member.

13. A liquid filter assembly as in claim 12 wherein the second oil filter element comprises a first filter member (21) and a second filter member (22), wherein the first filter member surrounds portions of the second filter member and the first liquid filter element.

14. A liquid filter assembly as in claim 13 wherein the housing comprises a tubular housing member having a general tube shape which surrounds portions of the second filter member and the first liquid filter element, and does not surround the first filter member of the second liquid filter element.

15. A liquid filter assembly as in claim 14, wherein the housing member comprises in inwardly extending rim formed by a fold in the housing member, and wherein the rim forms opposite surfaces which the flutter valve and the outlet plate are positioned against.

16. A liquid filter assembly comprising:
a first liquid filter element for filtering particles having a first minimum size;
a second liquid filter element for filtering particles having a second minimum size that is smaller than the first minimum size; and
a housing having the first and second liquid filter elements therein, wherein the housing and filter elements form partially separate liquid flow paths, wherein the first filter element is located in a first one of the flow paths, wherein the second filter element is located in a second one of the flow paths, wherein the second filter element surrounds a portion of the first filter element, and wherein said first and second liquid flow paths begin to merge in an open space at a center of said first liquid filter element.

17. A liquid filter assembly as in claim 16 further comprising a flutter valve located between an exit from the second liquid flow path and the open space located in the center of the first liquid filter element.

18. A liquid filter assembly as in claim 17 further comprising a plate located at the exit from the second liquid flow path between the flutter valve and the second liquid filter element, wherein the plate comprises a plurality of holes, wherein the flutter valve comprises a plurality of holes which are not aligned with the holes of the plate, and wherein the flutter valve can move against the plate to close the holes of the flutter valve relative to the holes of the plate.

19. A liquid filter assembly as in claim 18 further comprising a supporting frame member between the flutter valve and the open space, wherein the supporting frame member comprises a hole therethrough, and wherein the hole in the supporting frame member is not aligned with the holes in the flutter valve, and wherein the flutter valve can move against the supporting frame member to close the holes of the flutter valve relative to the hole of the supporting frame member.

20. A liquid filter assembly as in claim 16 wherein the second oil filter element comprises a first filter member (21) and a second filter member (22), wherein the first filter member surrounds portions of the second filter member and the first liquid filter element.

21. A liquid filter assembly comprising:
a first liquid filter element adapted to filter particles larger than a first size;
a second different liquid filter element adapted to filter particles larger than a second size, the second size being smaller than the first size, wherein the second liquid filter element surrounds at least a portion of the first liquid filter elements;
a housing having the first and second liquid filter elements therein, the housing forming a first liquid flow path having the first liquid filter element therein, and a second liquid flow path having the second liquid filter element therein,
wherein the first and second liquid flow paths share a common inlet pressure of liquid entering into the housing, wherein liquid from an outlet of the first liquid flow path and liquid from an outlet of the second liquid flow path combine at a mixing area, wherein the mixing area is in an open space in a center of the first filter element, wherein the filter assembly comprises a liquid flow path restriction orifice proximate the outlet of the second liquid flow path such that liquid pressure at the orifice proximate the outlet of the second liquid flow path is larger relative to liquid pressure at the outlet of the first liquid flow path into the mixing area, and wherein the first and second liquid flow paths begin to merge in an open space in the center of the first filter element.

22. A liquid filter assembly comprising:
a first liquid filter element adapted to filter particles larger than a first size;
a second different liquid filter element adapted to filter particles larger than a second size, the second size being smaller than the first size;
a housing having the first and second liquid filter elements therein, the housing forming a first liquid flow path having the first liquid filter element therein, and a second liquid flow path having the second liquid filter element therein,
wherein the first and second liquid flow paths share a common inlet pressure of liquid entering into the housing, wherein liquid from an outlet of the first liquid flow path and liquid from an outlet of the second liquid flow path combine at a mixing area, wherein the mixing area is in an open space in a center of the first filter element, wherein the filter assembly comprises a liquid flow path restriction orifice proximate the outlet of the second liquid flow path such that liquid pressure at the orifice proximate the outlet of the second liquid flow path is larger relative to liquid pressure at the outlet of the first liquid flow path into the mixing area, and wherein the first and second liquid flow paths begin to merge in an open space in the center of the first filter element,
and wherein the liquid filter assembly further comprises a flutter valve located between the outlet from the second liquid flow path and the open space located in the center of the first filter element.

23. A liquid filter assembly as in claim 22 further comprising a plate located at the outlet from the second liquid flow path between the flutter valve and the second liquid filter element, wherein the plate comprises a plurality of holes, wherein the flutter valve comprises a plurality of holes which are not aligned with the holes of the plate, and wherein the flutter valve can move against the plate to close the holes of the flutter valve relative to the holes of the plate.

24. A liquid filter assembly comprising:
a first liquid filter element for filtering particles having a first minimum size;

a second different liquid filter element for filtering particles having a second minimum size that is smaller than the first minimum size;

a housing having the first and second liquid filter elements therein, the housing forming a first liquid flow path having the first liquid filter element therein, and a second liquid flow path having the second liquid filter element therein, wherein the first and second liquid flow paths share a common inlet pressure of liquid entering into the housing, wherein liquid from an outlet of the first liquid flow path and liquid from an outlet of the second liquid flow path combine at a mixing area, wherein the mixing area is in an open space in a center of the first filter element; and a flutter valve located between the outlet from the second liquid flow path and the open space located in the center of the first filter element.

25. A liquid filter assembly as in claim 24 wherein the filter assembly comprises a liquid flow path restriction orifice proximate the outlet of the second liquid flow path into the mixing area such that liquid pressure at the orifice proximate the outlet of the second liquid flow path is larger relative to liquid pressure at the outlet of the first liquid flow path into the mixing area, and wherein the first and second liquid flow paths begin to merge in the open space in the center of the first filter element.

26. A liquid filter assembly as in claim 24 wherein the flutter valve comprises a resiliently deflectable member with at least one hole through the member.

27. A liquid filter assembly as in claim 24 wherein the flutter valve comprises a center section adapted to be moved up and down to contact an outlet plate from the second filter element and a top of a supporting frame of the first filter element.

28. A liquid filter assembly as in claim 27 wherein the outlet plate from the second filter has at least one hole which is adapted to be closed by the flutter valve when the flutter valve is moved against the outlet plate.

29. A liquid filter assembly as in claim 27 wherein the top of the supporting frame of the first filter element has at least one aperture which is adapted to be closed by the flutter valve when the flutter valve is moved against the top of the supporting frame of the first filter element.

30. A liquid filter assembly as in claim 29 wherein the at least one aperture in the top of the supporting frame of the first filter element comprises only one hole.

\* \* \* \* \*